UNITED STATES PATENT OFFICE.

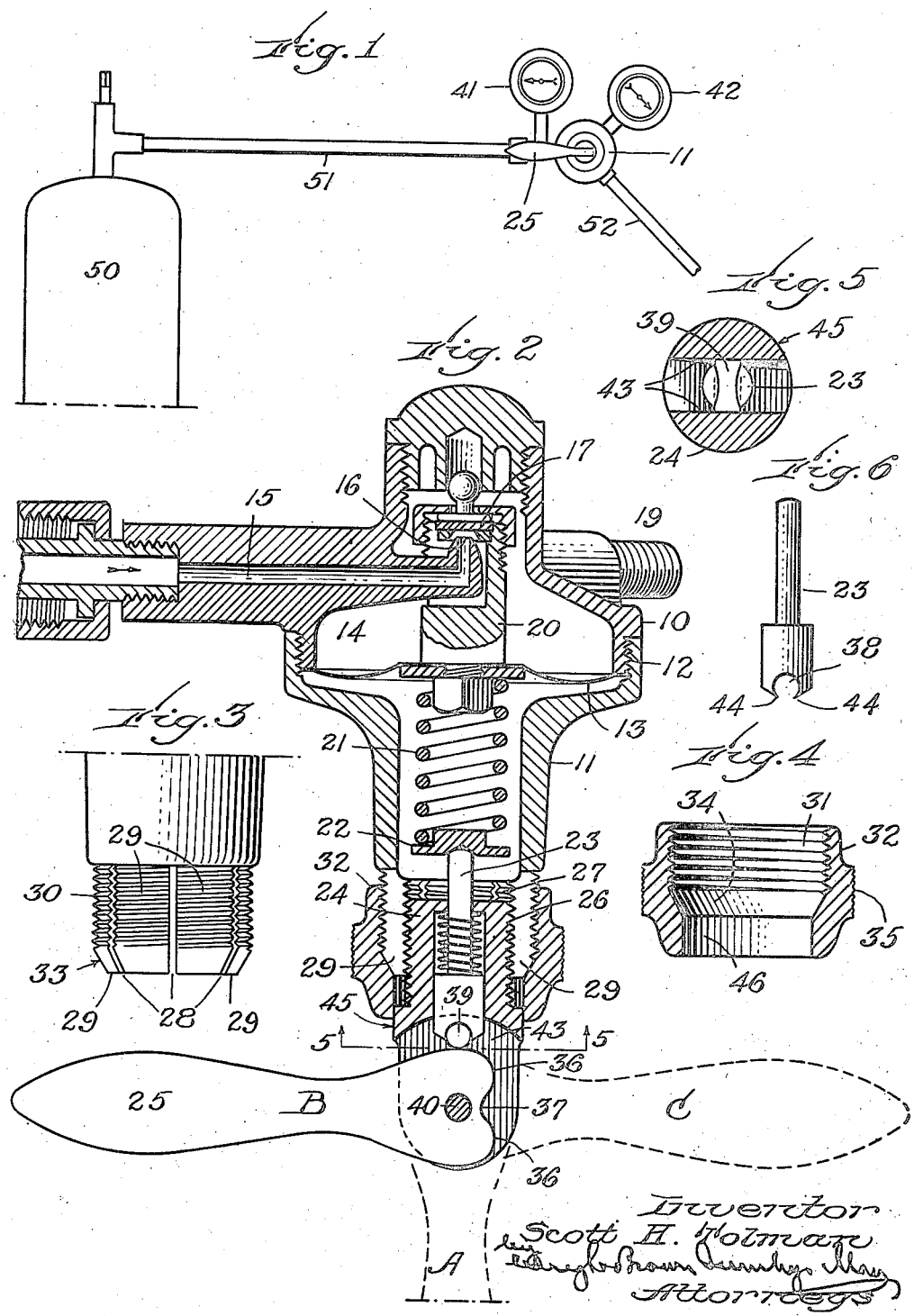

SCOTT H. TOLMAN, OF BOSTON, MASSACHUSETTS.

SPRING-REGULATING DEVICE.

1,324,083.   Specification of Letters Patent.   Patented Dec. 9, 1919.

Application filed July 19, 1917. Serial No. 181,669.

*To all whom it may concern:*

Be it known that I, SCOTT H. TOLMAN, a citizen of the United States, residing at Boston, in the county of Suffolk and State of Massachusetts, have invented new and useful Improvements in Spring-Regulating Devices, of which the following is a specification.

The object of the present invention is to provide improved spring-adjusting means for spring-controlled devices such as valves for controlling fluids under pressure. The spring-controlled device shown by the accompanying drawings is a valve of the type that reduces the pressure of a fluid, such valves being commonly known as "pressure-reducing valves".

A valve of the type above mentioned is usually provided with a spring by which it is normally opened, and with a diaphragm arranged to close it in consequence of an accumulation of pressure from the source of supply. The pressure of the fluid that is delivered from the valve is determined by the degree of applied stress of the valve-opening spring, and it is customary to provide such valves with means for varying the degree of spring stress to suit the conditions under which the valve is to be used. In some situations it is necessary to vary the applied stress of the spring frequently, according to varying conditions, and for this reason some reducing valves of the type mentioned have been provided with spring-regulating devices capable of changing the applied stress of the spring quickly from one predetermined degree to another, and vice versa, without disturbing the primary adjustment.

The present invention is embodied in a new and improved spring-regulating device suitable for the purpose explained, said device affording greater facility of operation and adjustment than those heretofore provided, and embodying improved structural features.

Referring to the accompanying drawings:

Figure 1 is an elevation on a relatively small scale, of fluid-feeding apparatus including my improved pressure reducing valve, and a supply tank for a fluid under pressure.

Fig. 2 represents a sectional view through said valve, three different angular positions of the regulating handle being indicated.

Fig. 3 represents an elevation of a portion of the valve casing.

Fig. 4 represents a sectional view of a nut that is adapted to coöperate with the structure shown by Fig. 3 to clamp the spring-regulating device.

Fig. 5 represents a sectional view through the structure intersected by line 5—5 of Fig. 2.

Fig. 6 represents an elevation of the spring-regulating plunger.

The same reference characters indicate the same parts, wherever they occur.

Although the valve shown is capable of being used for different purposes I have shown it as applied to a supply tank 50 for oxy-acetylene welding. Said tank may be the source of oxygen or acetylene gas for the purpose stated, and the gas may be under a relatively great degree of pressure in said tank. The gas is conducted from said tank to the pressure-reducing valve by a pipe 51, and is conducted from the pressure-reducing valve by pipe 52.

The main portion of the valve casing is indicated at 10, and a detachable bonnet portion 11 is detachably connected thereto by a screw-threaded joint 12. A flexible diaphragm 13 is soldered or otherwise joined to the portion 10 to provide a pressure chamber 14 in which the fluid under pressure may act in well-known manner.

The supply of fluid under pressure enters the valve casing through an inlet 15, said inlet having a valve seat 16 at its delivery end, in chamber 14. A valve member 17 is arranged to coact with seat 16 to control the admission of fluid into chamber 14. The fluid for use is conducted from chamber 14 through an outlet passageway 18, the portion 10 of the casing being provided with a suitable connection such as a screw-threaded nipple 19 to receive a pipe for conducting the fluid to the point of use.

The valve member 17 is carried by a stud 20, and the latter is carried by the diaphram 13. A helical compression spring 21 is arranged to be compressed so to act upon the stud 20 as to open the valve, but when the accumulation of fluid pressure in the chamber 14 is sufficient to overpower the applied force of the spring, such fluid pressure, acting upon diaphragm 13, will move the valve toward its seat, thus partially or entirely closing communication between the source of supply and the chamber 14. When the spring pressure is removed, the resiliency of the diaphragm under normal conditions is sufficient to move the valve member to closed position. It is well understood that increasing the applied force of spring 21 will result in an increase in the pressure of the fluid that is delivered from chamber 14, and that decreasing the force of the spring will result in a corresponding decrease of fluid pressure. I will now explain my improved spring-regulating device whereby the applied force of the spring may be changed from one predetermined degree to another and vice versa without disturbing the primary adjustment.

Spring 21 is seated upon the disk 22 and the latter is seated upon a plunger 23. The plunger is arranged to slide endwise in an adjustable screw plug 24, and its function is to transmit motion from a controlling member or regulating handle 25 to the disk 22, to alter the applied force of the spring. The plug 24 is provided with an external screw-thread 26, and said screw-thread coacts with an internal screw-thread 27 of the bonnet 11. This portion of the bonnet is divided by saw-cuts 28 into a plurality of resilient jaws 29 that are adapted to clamp the threaded portion of the plug 24 when they are compressed toward their common axis. The jaws 29 are provided with an external screw-thread 30 for coaction with the internal screw-thread 31 of a clamping nut 32. The free end portions of the jaws are beveled as indicated at 33, and the nut 32 with an internal frusto-conical surface 34 arranged to co-act with the beveled faces 33 to cause clamping action of the jaws. Nut 32 is intended to be operated by hand without the use of any tool, and for this reason it is provided with a knurled or otherwise roughened rim 35 whereby it may be encircled and grasped tightly by the thumb and forefinger of a hand.

The outer end of plug 24 is divided through the middle as shown by Fig. 5, to receive one end of the regulating handle 25. The handle is connected to the plug by pivot pin 40, and is formed with two cam surfaces 36, 36 between which is a depression 37. The depression is in the longitudinal central line of the handle, and the cam surfaces 36 are of substantially the same effect. The plunger 23 is provided with a socket 38, the surface of which is cylindric. A cylindric roll 39 is arranged in said socket and is capable of turning freely therein. Said roll bears upon the cam portion of the regulating handle and is adapted to enter the depression 37 when the handle is in its intermediate angular position as indicated at A. When the handle is in the angular position indicated at B or in that indicated at C the spring 21 is under a relatively great degree of compression, but when the handle is in its intermediate position as at A the degree of compression is relieved to a certain extent. When the valve is not in use the regulating handle would occupy position A, thus enabling the valve to close more readily. It would be optional with the user whether the handle were moved to position B or position C, and in this respect the regulator has the advantage that it may be moved in the direction that is more convenient.

As explained, the handle is capable of swinging through an arc of 180°, but, to secure certain desirable results, its movement might be limited to approximately 90°, in which case the regulating handle or controlling member would be provided, in addition to the depression 37, with only one of the cams 36.

The primary adjustment of the regulator is made by screwing the plug 24 in or out, and while making such adjustment the clamping nut 32 should be loosened. The regulating handle, when in a position at right angles to the axis of plug 24, is a convenient means for rotating the plug about said axis to obtain the desired primary adjustment. Then while the clamping nut 32 is being tightened with one hand the handle may be held with the other hand to hold the plug at said position of adjustment. When the handle is being used for the purpose last explained it maintains a relatively great degree of compression of spring 21, thus insuring the condition that is necessary to cause relatively high fluid pressure on the delivery side of the valve. Fig. 1 includes two pressure gages 41 and 42, the former being arranged to indicate the fluid pressure on the supply side of the valve, and the latter being arranged to indicate the fluid pressure on the delivery side of the valve. The user may therefore, by observing the indicator of gage 42 while moving the handle 25 about the axis of plug 24, know when the desired position of adjustment has been reached.

As shown by Fig. 5 the length of antifriction roll 39 is substantially equal to the width of the slot in which it is arranged, and the end faces of the roll are flat and at right angles to the axis. Said faces bear upon the confronting faces 43 of the plug, and the roll is thereby maintained in such position that its axis will always be parallel to the axis of pin 40 about which the cam element oscillates. The circumferential length of socket 38 is more than 180 degrees, but less than 360 degrees, and the points 44 are arranged to retain the roll 39 so that said roll cannot be placed in or removed from the socket excepting by endwise movement. Inasmuch as such endwise movement is impossible when the roll is between the faces 43, the roll cannot be detached from the plunger 23 without first removing said plunger from the plug 24.

The rotative movement of plug 24 for the purpose of obtaining the primary adjustment hereinbefore explained, is facilitated by providing the plug and the clamping nut with an external cylindric surface 45 and an internal cylindric surface 46 respectively. The surface 46 provides a smooth bearing for the surface 45, between the screw-threaded tongues 29 and the outer end of the plug.

From the foregoing description which I have given of the structure selected as illustrating an embodiment of the invention, it will be seen that I have accomplished thereby a very desirable result. In the use of welding or cutting torches, it is frequently necessary to cut off the flow of gas temporarily, and then to permit it to flow again, and, by the structure which I have illustrated, this is accomplished by a simple movement of a controlling member or regulating handle, which in its simplest form occupies either of two predetermined positions. In the horizontal position, with the cam 36 located to increase the pressure on the spring 21 and the diaphragm 13, the same predetermined increase in pressure is always applied to the spring 21, so that, each time the handle is moved into the position B or C, the same conditions as to the flow of gas are always obtained, no matter how many times the handle may be moved to what may be termed the closed position A to the open position B. This result is accomplished in such way that it does not interfere with the proper bodily adjustment of the lower end of the spring 21, because the plug, on which the handle is pivoted, is capable of vertical adjustment toward and from the diaphragm so as to secure such variation in the pressure of the spring 21 as may be desired, after which no further adjustment is necessary and the handle is capable of operating thereafter to always secure the same predetermined increase in pressure of the spring against the diaphragm.

I claim:

1. A gas-regulating valve comprising a casing having a diaphragm therein, a gas inlet for delivering gas into the casing above the diaphragm, a valve member connected to the diaphragm for coöperation with the gas inlet, a compression spring below the diaphragm, a plunger engaged with said spring, a plug adjustably secured to the casing and adjustable toward and from the diaphragm to vary the compression of the spring, and a regulating handle provided with a cam having a projection and a depression, said cam being engaged with the end of said plunger and mounted upon the carrier to occupy either of two predetermined positions and arranged when in one of said positions by the registration of said depression with said plunger to reduce the compression of the spring, and, when in the other position by the registration of said projection with said plunger, to increase the compression of the spring to a predetermined extent.

2. A device for regulating the applied force of a valve-controlling spring, said device comprising a screw plug arranged to screw in and out of the valve casing, a hand lever carried by and pivotally connected to said plug, and a plunger arranged in said plug between said lever and said spring to transmit motion from the lever to build up the applied force of the spring, said lever having two cam portions and an intermediate depressed portion arranged in a series, each of said cam portions being adapted to increase the applied force of the spring and said intermediate portion being adapted to relieve said force.

3. A device for regulating the applied force of a valve-controlling spring, said device comprising a screw plug arranged to screw in and out of the valve casing, a hand lever carried by and pivotally connected to said plug, and a plunger arranged in said plug between said lever and said spring to transmit motion from the lever to build up the applied force of the spring, said lever having two cam portions and an intermediate depressed portion arranged in a series, each of said cam portions being adapted to increase the applied force of the spring and said intermediate portion being adapted to relieve said force, the handle portion of said lever being diametrically opposite said intermediate portion and thereby in line with said plunger when in spring-relieving position.

4. A device for regulating the applied force of a valve-controlling spring, said device comprising a screw plug arranged to screw in and out of the valve casing, a hand lever carried by and pivotally connected to said plug, and a plunger arranged in said plug between said lever and said spring to transmit motion from the lever to build up the applied force of the spring, said lever having two cam portions and an intermediate depressed portion arranged in a series, each of said cam portions being adapted to increase the applied force of the spring and said intermediate portion being adapted to relieve said force, said cam portions being of equal spring-building effect to afford a choice of two directions of spring-building movement of the lever.

5. A device for regulating the applied force of a spring, said device comprising an operating cam, a plunger arranged to transmit motion from said cam to regulate the spring, means arranged to guide said plunger, and an anti-friction roller carried by said plunger and arranged to coact with said cam, said plunger having a socket conforming to said roller, said roller having end faces at right angles to its axis and said guiding means having parallel confronting faces arranged to engage said end faces to prevent angular motion of said roller about the axis of said plunger.

In testimony whereof I have affixed my signature.

SCOTT H. TOLMAN.